United States Patent
Nakanishi et al.

(10) Patent No.: US 11,415,238 B2
(45) Date of Patent: Aug. 16, 2022

(54) ELECTROMAGNETIC VALVE AND VALVE DEVICE

(71) Applicant: NIDEC TOSOK CORPORATION, Kanagawa (JP)

(72) Inventors: Tomohiko Nakanishi, Kanagawa (JP); Yuji Takada, Kanagawa (JP); Hiroki Shimizu, Kanagawa (JP); Naoki Tamura, Kanagawa (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 0 days.

(21) Appl. No.: 17/214,913

(22) Filed: Mar. 28, 2021

(65) Prior Publication Data

US 2021/0310574 A1 Oct. 7, 2021

(30) Foreign Application Priority Data

Apr. 1, 2020 (JP) .............................. JP2020-066003
Sep. 30, 2020 (JP) .............................. JP2020-166256

(51) Int. Cl.
*F16K 27/02* (2006.01)
*F16K 1/36* (2006.01)
*F16K 39/02* (2006.01)

(52) U.S. Cl.
CPC .............. *F16K 27/029* (2013.01); *F16K 1/36* (2013.01); *F16K 27/0272* (2013.01); *F16K 39/02* (2013.01)

(58) Field of Classification Search
CPC ................................................... F16K 27/029
See application file for complete search history.

(56) References Cited

U.S. PATENT DOCUMENTS

| | | | | |
|---|---|---|---|---|
| 2,543,010 A | * | 2/1951 | Gardner | F16K 31/0655 251/129.07 |
| 5,607,137 A | * | 3/1997 | Kanda | F16K 31/0693 251/129.07 |
| 6,463,951 B2 | * | 10/2002 | Shost | F02M 25/0836 137/15.18 |

FOREIGN PATENT DOCUMENTS

| | | |
|---|---|---|
| JP | 2005325887 | 11/2005 |
| JP | 5165676 | 3/2013 |
| WO | 2010023784 | 3/2010 |

* cited by examiner

*Primary Examiner* — Eric Keasel
(74) *Attorney, Agent, or Firm* — JCIPRNET

(57) ABSTRACT

An electromagnetic valve includes a mover that is able to move in a predetermined direction. The mover includes a valve body part including a valve body base part and an annular elastic body. The valve body base part includes a large diameter part and a small diameter part connected via a step difference. The annular elastic body includes a first contact surface, a second contact surface in contact with a step difference surface in the step difference, and a sealing projecting part that is able to come into contact with a peripheral edge part of an opening part of a first flow path in the predetermined direction. The sealing projecting part surrounds the opening part when seen in the predetermined direction. The sealing projecting part, the second contact surface, and the step difference surface are at least partially superimposed on each other when seen in the predetermined direction.

6 Claims, 3 Drawing Sheets

ELECTROMAGNETIC VALVE AND VALVE DEVICE

CROSS REFERENCE TO RELATED APPLICATIONS

The disclosure claims priority under 35 U.S.C. § 119 to Japanese Application No. 2020-066003 filed on Apr. 1, 2020 and Japanese Application No. 2020-166256 filed on Sep. 30, 2020, and the entire content of which is incorporated herein by reference.

TECHNICAL FIELD

The present disclosure relates to an electromagnetic valve and a valve device.

BACKGROUND

A valve device that includes a flow path member including a flow path and an electromagnetic valve that can open and close the flow path is known in the related art.

In a valve device in the related art, a flow path is opened and closed through switching between a state in which a valve body part of an electromagnetic valve blocks an opening part of the flow path and a state in which the valve body part is separated from the opening part of the flow path. However, there is a concern that a property of sealing the opening part with the valve body may be insufficient when the valve body part blocks the opening part of the flow part and it may not be possible to sufficiently close the flow path. Also, the valve device in the related art may include a ventilation hole that connects one side to another side in an axial direction inside a mover of the electromagnetic valve. However, there is a concern that gas will flow into the ventilation hole when the opening part of the flow path is in an opened state, which leads to degradation of the electromagnetic valve.

SUMMARY

According to an exemplary embodiment of the disclosure, there is provided an electromagnetic valve that is able to open and close a first flow path including an opening part opened on one side in a predetermined direction, in which the electromagnetic valve includes a mover that is movable in the predetermined direction. The mover includes a valve body part that is able to open and close the opening part. The valve body part includes a valve body base part including a large diameter part and a small diameter part that has an outer diameter smaller than an outer diameter of the large diameter part and is continuous with the large diameter part on another side in the predetermined direction via a step difference, and an annular elastic body having an annular shape surrounding the small diameter part and attached to the valve body base part. The small diameter part includes a flange part projecting outward in a radial direction. The annular elastic body includes a first contact surface that comes into contact with a surface of the flange part on the one side in the predetermined direction, a second contact surface that is in an annular shape and comes into contact with a step difference surface of the step difference facing the another side in the predetermined direction, and a sealing projecting part that is in an annular shape and is able to come into contact with a peripheral edge part of the opening part from the one side in the predetermined direction. The sealing projecting part surrounds the opening part when seen in the predetermined direction. The sealing projecting part, the second contact surface, and the step difference surface are at least partially superimposed on each other when seen in the predetermined direction.

According to an exemplary embodiment of the disclosure, there is provided a valve device including: the aforementioned electromagnetic valve; and a flow path member that includes the first flow path. The electromagnetic valve includes a guide tubular body in a tubular shape and surrounding the mover. The guide tubular body supports the mover such that the mover is movable in the predetermined direction. The flow path member includes a valve chamber into which the valve body part is inserted and a second flow path that communicates with the valve chamber. The first flow path is a flow path, which communicates with the valve chamber via the opening part, through which a fluid flowing into the valve chamber passes. The second flow path is a flow path through which the fluid flowing into the valve chamber via the first flow path flows out. The mover includes a ventilation hole that communicates with an inside of the electromagnetic valve. The ventilation hole includes an outer opening that is opened to an inside of the valve chamber in a state in which the sealing projecting part is in contact with a peripheral edge part of the opening part. The outer opening is entirely accommodated in the guide tubular body in a state in which the sealing projecting part is separated furthest in the predetermined direction from the peripheral edge part of the opening part.

According to an exemplary embodiment of the disclosure, there is provided a valve device including: a fluid member that includes a first flow path; and an electromagnetic valve that includes a mover that is movable in a predetermined direction and is able to open and close the first flow path, in which the first flow path includes an opening part that is opened on one side in the predetermined direction. The mover includes a valve body part that is able to open and close the opening part and a ventilation hole that communicates with an inside of the electromagnetic valve from one side to another side in an axial direction. The fluid member includes a valve chamber into which the valve body part is inserted. The electromagnetic valve includes a blocking part that separates the valve chamber in the axial direction. The ventilation hole includes an outer opening that is opened outward in a radial direction. The outer opening is located on one side in the axial direction beyond the blocking part when the opening part is in an opened state.

The above and other elements, features, steps, characteristics and advantages of the present disclosure will become more apparent from the following detailed description of the preferred embodiments with reference to the attached drawings.

DETAILED DESCRIPTION

In the following description, a direction that is parallel to the Z axis appropriately illustrated in each drawing is defined as an up-down direction. The positive side of the Z axis is defined as an upper side while the negative side of the Z axis will be defined as a lower side. The center axis J that is a virtual axis appropriately illustrated in each diagram extends in the Z-axis direction, that is, the direction that is parallel to the up-down direction. In the following description, the direction that is parallel to the axial direction of the center axis J will be simply referred to as an "axial direction". Also, a radial direction around the center axis J at the center will be simply referred to as a "radial direction", and a circumferential direction around the center axis J at the center will be simply referred to as a "circumferential direction" unless particularly indicated otherwise.

In the present exemplary embodiment, the axial direction corresponds to the "predetermined direction". The upper side corresponds to the "one side in the predetermined direction" while the lower side corresponds to the "another side in the predetermined direction". The up-down direction, the upper side, and the lower side are names to simply explain relative positional relationships of each part, and actual disposition relationships or the like may be disposition relationships or the like other than those indicated with these names.

Figure 1:
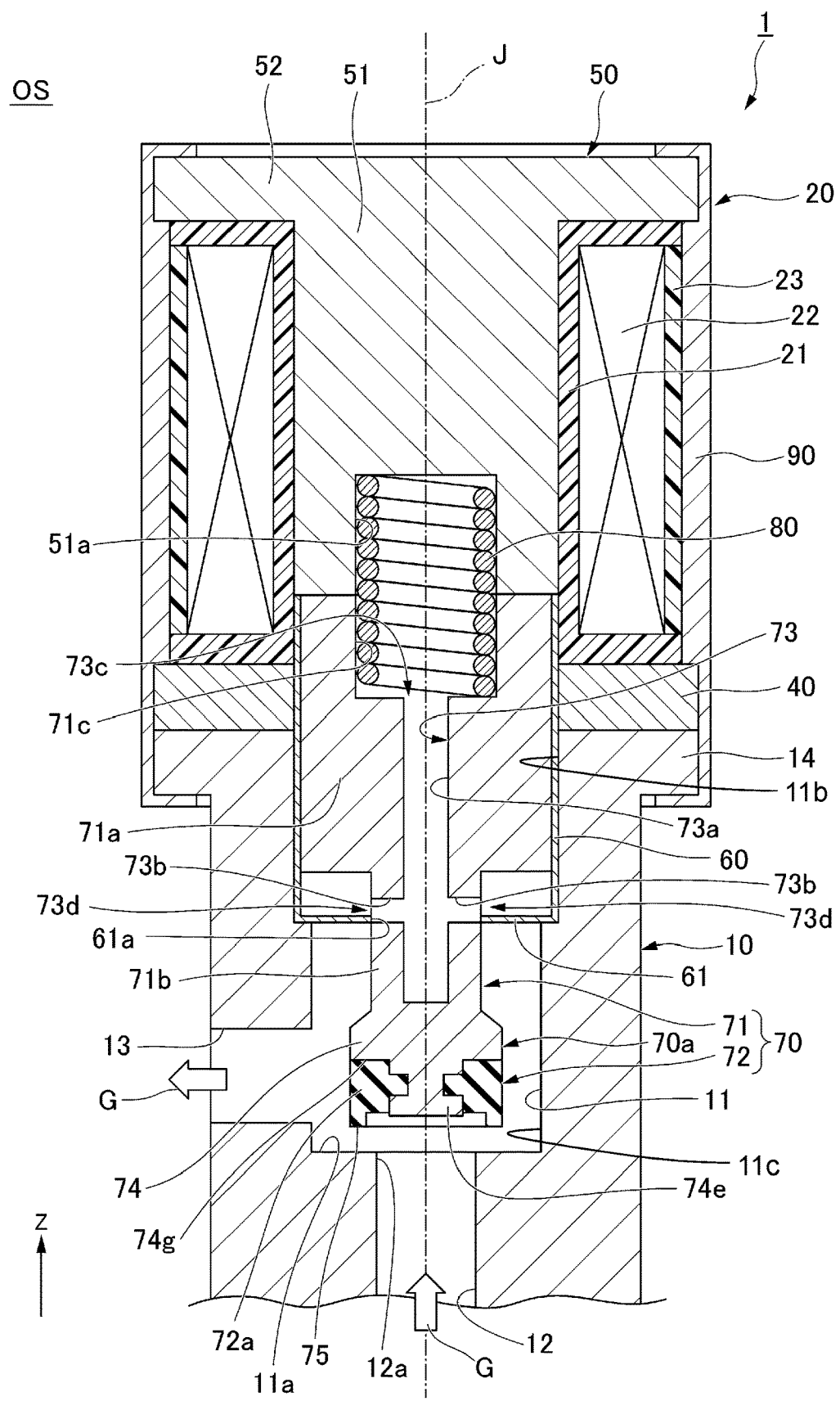
FIG. 1 is a sectional view illustrating a valve device according to the present exemplary embodiment and is a diagram illustrating an opened state in which a first flow path is opened.
Figure 2:
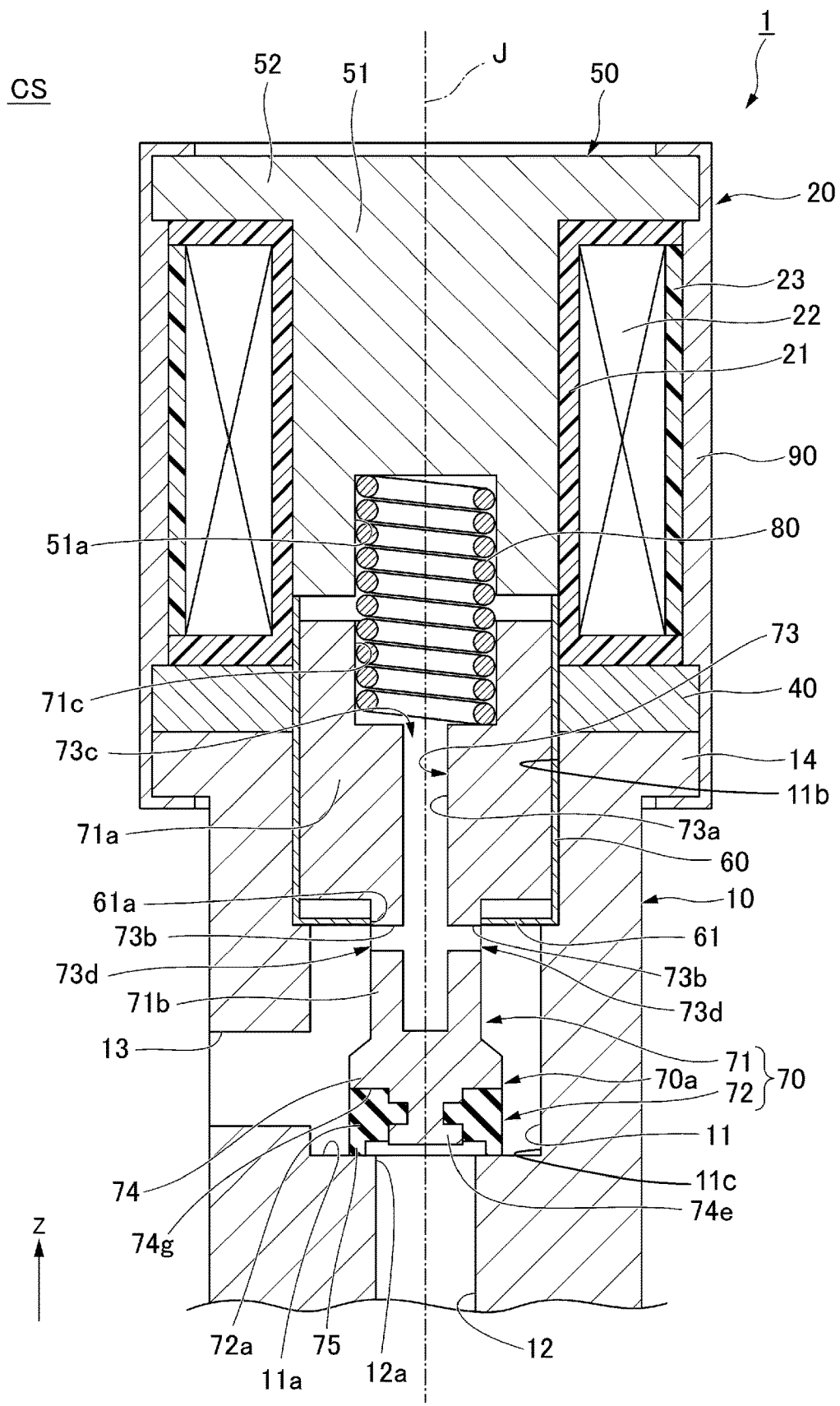
FIG. 2 is a sectional view illustrating the valve device according to the present exemplary embodiment and is a diagram illustrating a closed state in which the first flow path is closed.

A valve device 1 according to the present exemplary embodiment illustrated in FIGS. 1 and 2 is mounted in a vehicle. The valve device 1 is, for example, a positive crankcase ventilation valve (PCV valve). As illustrated in FIGS. 1 and 2, the valve device 1 according to the present exemplary embodiment includes a flow path member 10 and an electromagnetic valve 20. The flow path member 10 includes a metal in the present exemplary embodiment. A material of the flow path member 10 includes, for example, aluminum. Also, the flow path member 10 may include a resin. In a case in which the flow path member 10 includes a resin, it is possible to reduce the weight of the flow path member 10 as compared with a case in which the flow path member 10 includes a metal. It is thus possible to reduce the weight of the valve device 1.

The flow path member 10 includes a valve chamber 11, a first flow path 12, a second flow path 13, and a resin flange part 14. A valve body part 70a, which will be described later, is inserted into the valve chamber 11. In the present exemplary embodiment, the valve chamber 11 is configured such that an upper opening in a hole part which is recessed downward from an upper end part of the flow path member 10 is blocked with the electromagnetic valve 20.

In the present exemplary embodiment, the first flow path 12 is a flow path through which a fluid flowing into the valve chamber 11 passes. In other words, the first flow path 12 is an IN port in the present exemplary embodiment. The fluid is gas G in the present exemplary embodiment. The gas G is, for example, blowby gas. The first flow path 12 extends in the axial direction, for example. A flow path sectional shape of the first flow path 12 is, for example, a circular shape or a substantially circular shape around the center axis J at the center. The first flow path 12 includes an opening part 12a that is opened upward.

The opening part 12a is an end part of the first flow path 12. The opening part 12a is opened to the inside of the valve chamber 11. More specifically, the opening part 12a is opened in a bottom surface 11a on the lower side among inner surfaces of the valve chamber 11. In this manner, the first flow path 12 communicates with the valve chamber 11 via the opening part 12a. The bottom surface 11a is, for example, a flat surface that perpendicularly intersects the axial direction.

In the present exemplary embodiment, the second flow path 13 is a flow path through which the gas G flowing into the valve chamber 11 via the first flow path 12 flows out. In other words, the second flow path 13 is an OUT port in the present exemplary embodiment. The second flow path 13 extends in one direction that perpendicularly intersects the axial direction, for example. The second flow path 13 extends in the left-right direction in FIGS. 1 and 2, for example. The flow path sectional shape of the second flow path 13 is, for example, a circular shape or a substantially circular shape. The second flow path 13 communicates with the valve chamber 11. The second flow path 13 has a right end part in FIGS. 1 and 2 which communicates with the valve chamber 11.

The resin flange part 14 is provided at an upper end part of the flow path member 10. The resin flange part 14 projects outward in the radial direction. The resin flange part 14 has, for example, a circular ring shape around the center axis J at the center.

The electromagnetic valve 20 includes a bobbin 21, a coil 22, a resin member 23, an annular member 40, a core member 50, a guide tubular body 60, a mover 70, an elastic member 80, and an accommodation case 90. The bobbin 21 has a tubular shape surrounding the center axis J. The bobbin 21 has a cylindrical shape that is opened on both sides in the axial direction around the center axis J at the center, for example. The coil 22 is wound around the bobbin 21. In the present exemplary embodiment, the bobbin 21 includes a resin. The coil 22 is wound around the center axis J extending in the axial direction. In the present exemplary embodiment, the coil 22 is wound around the outer circumferential surface of the bobbin 21. The resin member 23 covers the coil 22 from the outer side in the radial direction.

The annular member 40 includes a magnetic body, for example. The annular member 40 has an annular shape surrounding the center axis J. The annular member 40 has a circular ring shape around the center axis J at the center, for example. The inner circumferential surface of the annular member 40 is located at the same position as that of the inner circumferential surface of the bobbin 21 in the radial direction, for example. The outer circumferential surface of the annular member 40 is located at the same position as that of the outer circumferential surface of the resin flange part 14 in the radial direction, for example. The annular member 40 is located below the bobbin 21. The annular member 40 is located above the resin flange part 14. The annular member 40 is pinched with the bobbin 21 and the resin flange part 14 in the axial direction.

The core member 50 includes a magnetic body, for example. The core member 50 includes a core member main body 51 and a core flange part 52. The core member main body 51 has a columnar shape extending in the axial direction. The core member main body 51 has a cylindrical columnar shape around the center axis J at the center, for example. The core member main body 51 is inserted into the inside of the bobbin 21 in the radial direction from the upper side. In the present exemplary embodiment, the core member main body 51 is fitted to the inside of the bobbin 21 in the radial direction. The core member main body 51 includes a holding recessed part 51a that is recessed upward from the lower surface of the core member main body 51. The holding recessed part 51a has a circular shape around the center axis J at the center when seen in the axial direction, for example.

The core flange part 52 projects outward in the radial direction from the upper end part of the core member main body 51. The core flange part 52 has a circular ring shape around the center axis J at the center, for example. The outer circumferential surface of the core flange part 52 is located at the same position as the outer circumferential surface of the resin flange part 14 and the outer circumferential surface of the annular member 40 in the radial direction, for example. The core flange part 52 is in contact with the upper end part of the bobbin 21.

The guide tubular body 60 has a tubular shape surrounding the mover 70. The guide tubular body 60 has a cylindrical shape opened upward around the center axis J at the center, for example. The guide tubular body 60 supports the mover 70 such that the mover 70 is movable in the axial direction. The guide tubular body 60 includes a non-magnetic body, for example. The guide tubular body 60 includes a non-magnetic metal, for example. The guide tubular body 60 has a blocking part 61 that separates the valve chamber 11 located on the lower side into two spaces along the axial direction. The blocking part 61 has a plate shape with a plate surface extending from the outer side in the radial direction on the another side in the axial direction toward the direction of the center axis J. For example, the blocking part 61 has a plate shape extending from the inner surface of the valve chamber 11 toward the direction of the center axis J. The blocking part 61 includes a through-hole 61a that penetrates through the blocking part 61 in the axial direction. The through-hole 61a has a circular shape around the center axis J at the center, for example, and the mover 70 is inserted thereinto in the axial direction. Although the inner diameter of the through-hole 61a is not particularly limited, it is preferable that a difference between the inner diameter of the through-hole 61a and the outer diameter of the mover 70 is smaller than an average particle size of impurities, for example. The valve chamber 11 separated by the blocking part 61 includes a first valve chamber 11b and a second valve chamber 11c. The first valve chamber 11b is located on the one side in the axial direction. In the present exemplary embodiment, the first valve chamber 11b corresponds to the inside of the tubular guide tubular body 60 surrounding the mover 70. The second valve chamber 11c is located on the another side in the axial direction and is connected to the first flow path 12 and the second flow path 13. Although the blocking part 61 is located below the guide tubular body 60, the blocking part 61 may have a plate shape extending from the inner surface of the valve chamber 11 toward the direction of the center axis J. For example, the blocking part 61 may be a portion of the flow path member 10, or the blocking part 61 may be fitted and secured to the inner surface of the valve chamber 11.

The mover 70 is movable in the axial direction. The mover 70 includes a mover main body 71 and an annular elastic body 72. The mover main body 71 includes a magnetic body, for example. The mover main body 71 extends in the axial direction. The mover main body 71 has, for example, a cylindrical columnar shape around the center axis J at the center. The mover main body 71 includes a body part 71a, a neck part 71b, and a valve body base part 74. In the present exemplary embodiment, the valve body base part 74 and the annular elastic body 72 define the valve body part 70a. In other words, the mover 70 includes the valve body part 70a, and the valve body part 70a includes the valve body base part 74 and the annular elastic body 72. The valve body part 70a is able to open and close the opening part 12a.

In the present exemplary embodiment, the body part 71a is an upper portion of the mover main body 71. The body part 71a is fitted to the inside of the guide tubular body 60 in the radial direction. The body part 71a is supported by the guide tubular body 60 such that the body part 71a is movable in the axial direction. The dimension of the body part 71a in the axial direction is smaller than the dimension of the guide tubular body 60 in the axial direction. The outer edge part of the body part 71a in the radial direction is disposed to face the upper side of the blocking part 61 with a gap interposed therebetween.

The body part 71a includes a holding recessed part 71c recessed downward from the upper end surface of the body part 71a. The holding recessed part 71c has, for example, a circular shape around the center axis J at the center when seen in the axial direction. The holding recessed part 71c faces the holding recessed part 51a provided at the core member 50 in the axial direction. The insides of the holding recessed parts 51a and 71c are portions inside the electromagnetic valve 20 at which the elastic member 80 is disposed. The upper end surface of the body part 71a is an upper end surface of the mover main body 71. The upper end surface of the mover main body 71 faces the lower end surface of the core member 50 in the axial direction. In the present exemplary embodiment, the lower end surface of the core member 50 is a lower end surface of the core member main body 51.

In the present exemplary embodiment, the neck part 71b is a portion of a lower portion of the mover main body 71. The neck part 71b extends downward from the lower end part of the body part 71a. The outer diameter of the neck part 71b is smaller than the outer diameter of the body part 71a. The neck part 71b is caused to pass through the through-hole 61a in the axial direction. The neck part 71b is fitted into the through-hole 61a. The lower portion of the neck part 71b is inserted into the valve chamber 11 via the through-hole 61a.

Figure 3:
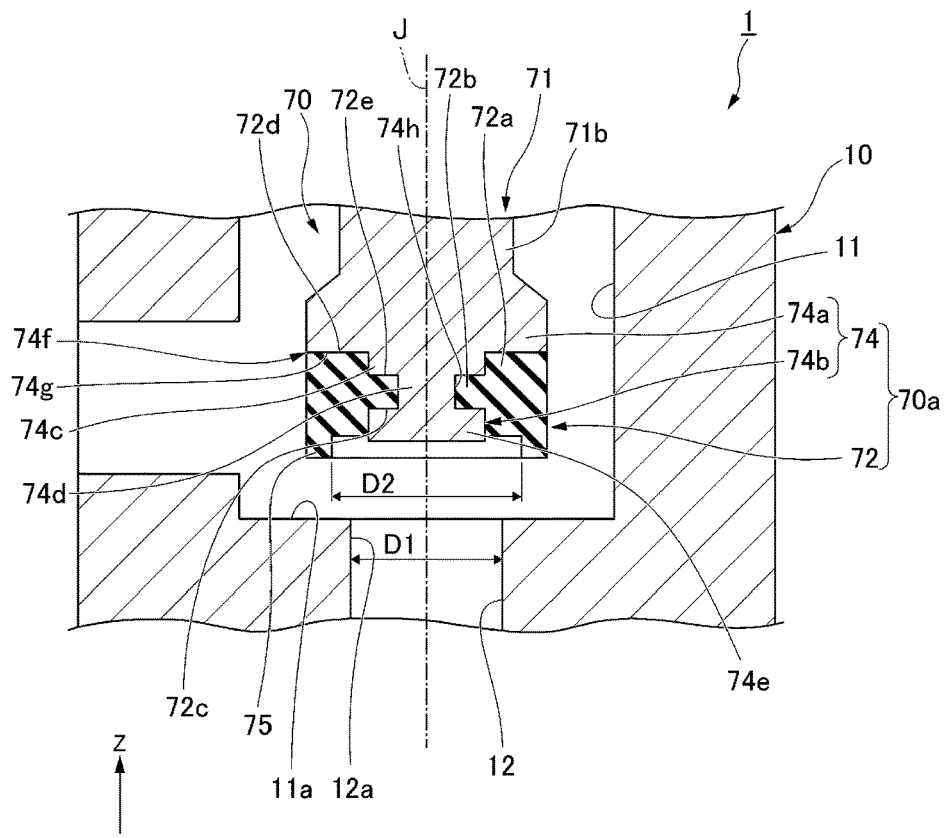
FIG. 3 is a sectional view illustrating a portion of the valve device according to the present exemplary embodiment.

The valve body base part 74 is continuous with the lower end part of the neck part 71b. The valve body base part 74 has, for example, a cylindrical columnar shape around the center axis J at the center. As illustrated in FIG. 3, the valve body base part 74 includes a large diameter part 74a and a small diameter part 74b. The large diameter part 74a is a portion that is continuous with the lower end part of the neck part 71b. The outer diameter of the large diameter part 74a is larger than the outer diameter of the neck part 71b, the inner diameter of the through-hole 61a, and the inner diameter D1 of the opening part 12a, for example.

The outer diameter of the small diameter part 74b is smaller than the outer diameter of the large diameter part 74a. The small diameter part 74b is continuous with the lower side of the large diameter part 74a via a step difference 74f. The step difference 74f is a step difference recessed inward in the radial direction when the outer circumferential surface of the valve body base part 74 is traced from the large diameter part 74a to the small diameter part 74b. The step difference 74f includes a step difference surface 74g facing downward. The step difference surface 74g is a lower surface of the large diameter part 74a. The step difference surface 74g is, for example, a flat surface that perpendicularly intersects the axial direction. The step difference surface 74g has, for example, a circular ring shape around the center axis J at the center. The inner diameter of the step difference surface 74g is smaller than the inner diameter D1 of the opening part 12a, for example. The outer diameter of the step difference surface 74g is the same as the outer diameter of the large diameter part 74a.

The small diameter part 74b includes a groove 74h recessed inward in the radial direction at the center part in the axial direction. The groove 74h has an annular shape surrounding the center axis J. The groove 74h has, for example, a circular ring shape around the center axis J at the center. With the groove 74h, the small diameter part 74b includes three portions with outer diameters changing in the axial direction. In other words, the small diameter part 74b includes a root part 74c, a coupling part 74d, and a flange part 74e.

The root part 74c is a portion of the small diameter part 74b located above the groove 74h. The root part 74c is continuous with the large diameter part 74a. More specifically, the root part 74c is continuous with the large diameter part 74a on the lower side via the step difference 74f.

The coupling part 74d is a portion of the small diameter part 74b at which the groove 74h is provided. The outer diameter of the coupling part 74d is smaller than the outer diameter of the root part 74c and the outer diameter of the flange part 74e. The coupling part 74d is continuous with the root part 74c on the lower side via the step difference. The coupling part 74d connects the root part 74c and the flange part 74e in the axial direction.

The flange part 74e is a portion of the small diameter part 74b located on the lower side beyond the groove 74h. In the present exemplary embodiment, the flange part 74e is a lower end part of the small diameter part 74b. The outer diameter of the flange part 74e is larger than the outer diameter of the coupling part 74d. The outer diameter of the flange part 74e is the same as the outer diameter of the root part 74c, for example. The flange part 74e is continuous with the coupling part 74d on the lower side via the step difference. The flange part 74e projects outward in the radial direction beyond the coupling part 74d. The outer portion of the flange part 74e in the radial direction is located below the outer portion of the root part 74c in the radial direction with a gap therebetween.

The annular elastic body 72 has an annular shape surrounding the small diameter part 74b. The annular elastic body 72 has, for example, a circular ring shape around the center axis J at the center. The annular elastic body 72 is attached to the valve body base part 74. In the present exemplary embodiment, the annular elastic body 72 is fitted to the small diameter part 74b and is attached to the valve body base part 74. The annular elastic body 72 includes rubber, for example. The annular elastic body 72 includes a main body part 72a, a pinched part 72b, and a sealing projecting part 75.

The main body part 72a surrounds a portion of the small diameter part 74b except for the lower end part of the flange part 74e. The main body part 72a has, for example, a circular ring shape around the center axis J at the center. The inner circumferential surface of the main body part 72a is in contact with the outer circumferential surface of the root part 74c and the outer circumferential surface of the flange part 74e. The main body part 72a is located below the step difference surface 74g. The upper surface of the main body part 72a is a second contact surface 72d that comes into contact with the step difference surface 74g. In other words, the annular elastic body 72 includes the second contact surface 72d that comes into contact with the step difference surface 74g of the step difference 74f facing downward. This can curb movement of the annular elastic body 72 upward relative to the valve body base part 74.

The second contact surface 72d is an annular surface facing upward. The second contact surface 72d is, for example, a flat surface that perpendicularly intersects the axial direction. The second contact surface 72d has, for example, a circular ring shape around the center axis J at the center. The inner diameter of the second contact surface 72d is the same as the inner diameter of the step difference surface 74g, for example. The outer diameter of the second contact surface 72d is the same as the outer diameter of the step difference surface 74g, for example. The inner edge part of the second contact surface 72d in the radial direction is located at the same position as that of the inner edge part in the radial direction of the step difference surface 74g in the radial direction, for example. The outer edge part of the second contact surface 72d is located at the same position as that of the outer edge part in the radial direction of the step difference surface 74g in the radial direction, for example. In the present exemplary embodiment, the second contact surface 72d is entirely in contact with the step difference surface 74g. The entire second contact surface 72d and the entire step difference surface 74g are superimposed on each other when seen in the axial direction, for example. The area of the second contact surface 72d and the area of the step difference surface 74g are the same as each other, for example.

The lower surface of the main body part 72a is an annular surface facing downward. The lower surface of the main body part 72a is, for example, a flat surface that perpendicularly intersects the axial direction. The lower surface of the main body part 72a has, for example, a circular ring shape around the center axis J at the center. In the present exemplary embodiment, the lower surface of the main body part 72a is located outside the flange part 74e in the radial direction. The lower surface of the main body part 72a surrounds the flange part 74e. The lower surface of the main body part 72a is located on the upper side beyond the lower end surface of the flange part 74e, for example. In the present exemplary embodiment, the lower end surface of the flange part 74e is a lower end surface of the small diameter part 74b.

The pinched part 72b projects inward in the radial direction from the inner circumferential surface of the main body part 72a. The pinched part 72b has an annular shape surrounding the coupling part 74d. The pinched part 72b has, for example, a circular ring shape around the center axis J at the center. The inner circumferential surface of the pinched part 72b is in contact with the outer circumferential surface of the coupling part 74d. The pinched part 72b is fitted to the inside of the groove 74h. The pinched part 72b is pinched with the root part 74c and the flange part 74e in the axial direction.

The pinched part 72b includes a first contact surface 72c and a third contact surface 72e. In other words, the annular elastic body 72 includes the first contact surface 72c and the third contact surface 72e. The first contact surface 72c is a lower surface of the pinched part 72b. The first contact surface 72c faces downward. The first contact surface 72c is, for example, a flat surface that perpendicularly intersects the axial direction. The first contact surface 72c has, for example, a circular ring shape around the center axis J at the center. The first contact surface 72c is in contact with the upper surface of the flange part 74e. This can curb movement of the annular elastic body 72 downward relative to the valve body base part 74. In this manner, it is possible to curb movement of the annular elastic body 72 in the axial direction relative to the valve body base part 74 by the first contact surface 72c coming into contact with the upper surface of the flange part 74e and by the second contact surface 72d coming into contact with the step difference surface 74g. Therefore, it is possible to curb deviation of the annular elastic body 72 from the valve body base part 74 in the axial direction.

The third contact surface 72e is an upper surface of the pinched part 72b. The third contact surface 72e faces upward. The third contact surface 72e is, for example, a flat surface that perpendicularly intersects the axial direction. The third contact surface 72e has, for example, a circular ring shape around the center axis J at the center. The third contact surface 72e is in contact with the lower surface of the root part 74c.

The sealing projecting part 75 projects downward from the main body part 72a. In the present exemplary embodiment, the sealing projecting part 75 projects downward from the outer edge part in the radial direction of the lower surface of the main body part 72a. The sealing projecting part 75 has an annular shape surrounding the center axis J. The sealing projecting part 75 has, for example, a circular ring shape around the center axis J at the center. The sealing projecting part 75 is opened downward. The sealing projecting part 75 surrounds the lower end part of the flange part 74e, for example. The lower end part of the sealing projecting part 75 is located on the lower side beyond the lower end part of the flange part 74e, for example. The dimension of the sealing projecting part 75 in the axial direction is smaller than the dimension of the main body part 72a in the axial direction and the dimension of the pinched part 72b in the axial direction, for example.

In the present exemplary embodiment, the thickness of the sealing projecting part 75 in the radial direction is entirely uniform along the axial direction. Also, the "thickness of the sealing projecting part in the radial direction" in the specification corresponds to the distance between the inner circumferential surface of the sealing projecting part and the outer circumferential surface of the sealing projecting part in the radial direction. The lower surface of the sealing projecting part 75 is, for example, a flat surface that perpendicularly intersects the axial direction. The inner diameter D2 of the sealing projecting part 75 is larger than the inner diameter D1 of the opening part 12a. The inner edge of the sealing projecting part 75 is located outward beyond the inner edge of the opening part 12a when seen in the axial direction. In other words, the inner edge part of the sealing projecting part 75 in the radial direction is located outward in the radial direction beyond the inner edge part of the opening part 12a in the radial direction. The sealing projecting part 75 surrounds the opening part 12a when seen in the axial direction. The sealing projecting part 75 faces the peripheral edge part of the opening part 12a in the bottom surface 11a in the axial direction. The sealing projecting part 75 is able to come into contact with the peripheral edge part of the opening part 12a from the upper side.

The outer diameter of the sealing projecting part 75 is the same as the outer diameter of the main body part 72a, the outer diameter of the second contact surface 72d, and the outer diameter of the step difference surface 74g, for example. The outer edge part of the sealing projecting part 75 in the radial direction is located at the same position in the radial direction as those of the outer edge part of the main body part 72a in the radial direction, the outer edge part of the second contact surface 72d in the radial direction, and the outer edge part of the step difference surface 74g in the radial direction, for example.

In the present exemplary embodiment, the sealing projecting part 75 is entirely superimposed on the second contact surface 72d and the step difference surface 74g when seen in the axial direction. The sealing projecting part 75, the second contact surface 72d, and the step difference surface 74g are at least partially superimposed on each other when seen in the axial direction. The area of the lower surface of the sealing projecting part 75 is smaller than the area of the second contact surface 72d and the area of the step difference surface 74g.

As illustrated in FIGS. 1 and 2, the mover main body 71 includes a ventilation hole 73 that connects the one side to the another side in the axial direction. In this manner, the mover 70 includes the ventilation hole 73. The ventilation hole 73 includes an axial-direction extending part 73a and a radial-direction extending part 73b. The axial-direction extending part 73a extends in the axial direction from the bottom surface of the holding recessed part 71c to the neck part 71b. The bottom surface of the holding recessed part 71c is a surface of the inner surface of the holding recessed part 71c located on the lower side. In the section that perpendicularly intersects the axial direction in which the axial-direction extending part 73a extends, the sectional shape of the axial-direction extending part 73a is, for example, a circular shape around the center axis J at the center. The axial-direction extending part 73a is a hole with a bottom part on the lower side.

The upper end part of the axial-direction extending part 73a is an inner opening 73c. In this manner, the ventilation hole 73 includes an inner opening 73c. The inner opening 73c is opened upward and is opened to the inside of the holding recessed part 71c. In other words, the inner opening 73c is opened at a portion inside the electromagnetic valve 20 at which the elastic member 80 is disposed. The ventilation hole 73 communicates with the inside of the electromagnetic valve 20 via the inner opening 73c.

In the present exemplary embodiment, the radial-direction extending part 73b is provided at the neck part 71b. More specifically, the radial-direction extending part 73b is provided at the upper portion of the neck part 71b. The radial-direction extending part 73b extends in the radial direction from the inner circumferential surface of the axial-direction extending part 73a to the outer circumferential surface of the neck part 71b. In the section that perpendicularly intersects the radial direction in which the radial-direction extending part 73b extends, the sectional shape of the radial-direction extending part 73b is, for example, a circular shape. For example, a pair of radial-direction extending parts 73b are provided with the center axis J interposed therebetween, for example.

The outer end part of the radial-direction extending part 73b in the radial direction is an outer opening 73d. In this manner, the ventilation hole 73 includes the outer opening 73d. The outer opening 73d is opened outward in the radial direction. As illustrated in FIG. 2, the outer opening 73d is at least partially located on the another side in the axial direction beyond the blocking part 61 in a state in which the sealing projecting part 75 is in contact with the peripheral edge part of the opening part 12a, and is opened to the inside of the second valve chamber 11c. The state in which the sealing projecting part 75 is in contact with the peripheral edge part of the opening part 12a is a closed state CS, which will be described later. Although in the present exemplary embodiment, the outer opening 73d is entirely located on the another side in the axial direction beyond the blocking part 61 and is opened to the inside of the second valve chamber 11c in the closed state CS, it is also possible that a portion of the outer opening 73d except for the upper end part is located on the another side in the axial direction beyond the blocking part 61 and is opened to the inside of the second valve chamber 11c. On the other hand, as illustrated in FIG. 1, in a state in which the sealing projecting part 75 is separated furthest in the axial direction from the peripheral edge part of the opening part 12a, the outer opening 73d is entirely located on the one side in the axial direction beyond the blocking part 61, is accommodated in the guide tubular body 60, and is opened to the inside of the first valve chamber 11b. The state in which the sealing projecting part 75 is separated furthest in the axial direction from the peripheral edge part of the opening part 12a is a state in which the mover 70 disposed to be movable in the axial direction is located on the uppermost side and is an opened state OS, which will be described later.

The elastic member 80 is, for example, a coil spring extending in the axial direction. The elastic member 80 is disposed inside the electromagnetic valve 20. In the present exemplary embodiment, the elastic member 80 is disposed across the inside of the holding recessed part 51a and the inside of the holding recessed part 71c. The lower end part of the elastic member 80 is in contact with the bottom surface of the holding recessed part 71c. The upper end part of the elastic member 80 is in contact with the bottom surface of the holding recessed part 51a. The bottom surface of the holding recessed part 51a is a surface of the inner surface of the holding recessed part 51a located on the upper side. The elastic member 80 applies an elastic force in the axial direction to the mover 70. In the present exemplary embodiment, the elastic member 80 applies an elastic force directed downward to the mover 70.

The accommodation case 90 has a tubular shape surrounding the center axis J. The accommodation case 90 has, for example, a cylindrical shape or a substantially cylindrical shape that is opened on both sides in the axial direction around the center axis J at the center. The accommodation case 90 accommodates the bobbin 21, the coil 22, the resin member 23, the annular member 40, the core member 50, the upper portion of the guide tubular body 60, the upper portion of the mover 70, and the elastic member 80 therein. The accommodation case 90 includes a magnetic body, for example.

The lower end part of the accommodation case 90 is crimped on the inner side in the radial direction and is in contact with the resin flange part 14 from the lower side. The upper end part of the accommodation case 90 is crimped on the inner side in the radial direction and is in contact with the core flange part 52 from the upper side. The resin flange part 14, the annular member 40, the bobbin 21, and the core flange part 52 are pinched in the axial direction by crimping parts on both sides of the accommodation case 90 in the axial direction and are secured to each other. In this manner, the electromagnetic valve 20 is attached to the flow path member 10.

The valve device 1 according to the present exemplary embodiment is switched between the opened state OS in which the first flow path 12 is opened and the closed state CS in which the first flow path 12 is closed by the electromagnetic valve 20. FIG. 1 illustrates the opened state OS while FIG. 2 illustrates the closed state CS.

In a case in which no power is supplied to the electromagnetic valve 20, the valve device 1 is in the closed state CS illustrated in FIG. 2. In the closed state CS, the mover 70 is pushed downward by the elastic member 80, and the sealing projecting part 75 is pressed from the upper side against the peripheral edge part of the opening part 12a in the bottom surface 11a. In this manner, the portion between the lower surface of the sealing projecting part 75 and the peripheral edge part of the opening part 12a in the bottom surface 11a is sealed over the entire circumference, and the opening part 12a surrounded by the sealing projecting part 75 when seen in the axial direction is blocked by the valve body part 70a. Therefore, the first flow path 12 is closed, and flowing of the gas G from the first flow path 12 into the valve chamber 11 is inhibited. Also, in the closed state CS in which no power is supplied to the electromagnetic valve 20, the upper end surface of the mover 70 is located separately below the lower end surface of the core member 50. In the present exemplary embodiment, the upper end surface of the mover 70 is the upper end surface of the mover main body 71.

On the other hand, in a case in which power is supplied to the electromagnetic valve 20, the valve device 1 is brought into the opened state OS illustrated in FIG. 1. If power is supplied to the electromagnetic valve 20, then a current flows through the coil 22, and a magnetic field in which a magnetic flux flows in the axial direction is generated on the inner side of the coil 22 in the radial direction. In this manner, a magnetic circuit passing through each part of the electromagnetic valve 20 made of a magnetic body is defined.

Specifically, in a case in which the magnetic flux caused by the magnetic field of the coil 22 flows from the lower side to the upper side on the inner side of the coil 22 in the radial direction, for example, a magnetic circuit in which the magnetic flux passes from the body part 71a of the mover main body 71 through the core member main body 51, the core flange part 52, the accommodation case 90, and the annular member 40 in this order and returns to the body part 71a of the mover main body 71 is defined. In this manner, each part made of a magnetic body is excited, and a magnetic force attracting each other is generated between the mover main body 71 and the core member 50. Therefore, it is possible to cause the mover 70 to move upward against the elastic force of the elastic member 80 by supplying sufficient power to the electromagnetic valve 20 and increasing the magnetic force generated between the mover main body 71 and the core member 50 to be greater than the elastic force of the elastic member 80. In this manner, the sealing projecting part 75 is separated upward from the peripheral edge part of the opening part 12a, and the opening part 12a is opened to the inside of the valve chamber 11. Thus, the first flow path 12 is opened, and the flowing of the gas G from the first flow path 12 into the valve chamber 11 is allowed. The gas G that has flowed into the valve chamber 11 flows out from the second flow path 13.

Also, in the opened state OS in which power is supplied to the electromagnetic valve 20, the upper end surface of the mover 70 comes into contact with the lower end surface of the core member 50. In this state, the upper end surface of the mover main body 71 and the lower end surface of the core member 50 are in a state in which they are attached to each other due to a magnetic force.

If power supply to the electromagnetic valve 20 is stopped, then the magnetic circuit disappears, and the magnetic force between the mover main body 71 and the core member 50 disappears. Therefore, the mover 70 moves downward due to the elastic force of the elastic member 80. In this manner, the sealing projecting part 75 comes into contact with the peripheral edge part of the opening part 12a, and the first flow path 12 is closed.

As described above, according to the present exemplary embodiment, it is possible to cause the mover 70 to move in the axial direction and to open and close the first flow path 12 with the movement of the mover 70 by switching ON/OFF of the power supplied to the electromagnetic valve 20. The electromagnetic valve 20 is able to open and close the first flow path 12 in this manner.

Also, the magnetic field generated by the coil 22 may be a magnetic field in which a magnetic flux flows from the upper side to the lower side on the inner side of the coil 22 in the radial direction. In this case, a magnetic circuit in which the magnetic flux passes from the core member main body 51 through the body part 71a of the mover main body 71, the annular member 40, the accommodation case 90, and the core flange part 52 in this order and returns to the core member main body 51 is defined. It is possible to cause the mover 70 to move upward due to the magnetic force by exciting each part made of a magnetic body even with such a magnetic circuit.

According to the present exemplary embodiment, the annular elastic body 72 includes the sealing projecting part 75 that is in an annular shape and is able to come into contact with the peripheral edge part of the opening part 12a from the upper side. Therefore, when the valve body part 70a is pressed against the peripheral edge part of the opening part 12a from the upper side by the mover 70 moving downward, the sealing projecting part 75 is pressed against the peripheral edge part of the opening part 12a. In this manner, it is possible to reduce the contact area between the valve body part 70a and the peripheral edge part of the opening part 12a as compared with a case in which the entire lower surface of the main body part 72a comes into contact with the peripheral edge part of the opening part 12a, for example. Therefore, it is possible to increase the pressure generated between the valve body part 70a and the peripheral edge part of the opening part 12a. It is thus possible to suitably press the valve body part 70a against the peripheral edge part of the opening part 12a. In this manner, it is possible to suitably seal the portion between the lower surface of the sealing projecting part 75 and the peripheral edge part of the opening part 12a. Thus, it is possible to suitably seal the opening part 12a surrounded by the sealing projecting part 75 when seen in the axial direction. Therefore, it is possible to improve a property of sealing the opening part 12a with the valve body part 70a. In this manner, it is possible to curb leakage of the gas G in the first flow path 12 to the inside of the valve chamber 11 in the closed state CS.

Also, the sealing projecting part 75 which is a portion of the annular elastic body 72 is likely to be elastically deformed by being pressed against the peripheral edge part of the opening part 12a with a relatively large pressure. In this manner, the pressed sealing projecting part 75 is easily caused to adhere to the peripheral edge part of the opening part 12a. It is thus possible to more suitably seal the portion between the lower surface of the sealing projecting part 75 and the peripheral edge part of the opening part 12a. Therefore, it is possible to further improve the property of sealing the opening part 12a with the valve body part 70a.

Also, according to the present exemplary embodiment, the sealing projecting part 75, the second contact surface 72d, and the step difference surface 74g are at least partially superimposed on each other when seen in the axial direction. Therefore, when the sealing projecting part 75 is pressed against the peripheral edge part of the opening part 12a from the upper side by the mover 70 moving downward, a downward force applied from the valve body base part 74 to the annular elastic body 72 via the step difference surface 74g and the second contact surface 72d is transmitted straight in the axial direction to the peripheral edge part of the opening part 12a via the sealing projecting part 75. In this manner, it is possible to more suitably press the sealing projecting part 75 against the peripheral edge part of the opening part 12a. Therefore, it is possible to suitably seal the portion between the lower surface of the sealing projecting part 75 and the peripheral edge part of the opening part 12a. In this manner, it is possible to further improve the property of sealing the opening part 12a with the valve body part 70a.

Also, if the sealing projecting part 75 is pressed against the peripheral edge part of the opening part 12a from the upper side, then an upward reaction force received by the sealing projecting part 75 from the peripheral edge part of the opening part 12a is transmitted straight in the axial direction to the step difference surface 74g via the second contact surface 72d. In this manner, the annular elastic body 72 is suitably pressed against the step difference surface 74g via the second contact surface 72d. Therefore, it is possible to suitably seal the portion between the second contact surface 72d and the step difference surface 74g as well. It is thus possible to stop the entering gas G at the portion between the second contact surface 72d and the step difference surface 74g even in a case in which the gas G in the first flow path 12 has entered the portion between the flange part 74e and the annular elastic body 72 in the radial direction in the closed state CS. In this manner, it is possible to further curb leakage of the gas G in the first flow path 12 to the inside of the valve chamber 11 in the closed state CS. Therefore, it is possible to further improve the property of sealing the opening part 12a with the valve body part 70a.

Also, according to the present exemplary embodiment, the sealing projecting part 75 is entirely superimposed on the second contact surface 72d and the step difference surface 74g when seen in the axial direction. Therefore, it is possible to suitably press the entire sealing projecting part 75 against the peripheral edge part of the opening part 12a via the step difference surface 74g and the second contact surface 72d. Also, it is possible to suitably press the second contact surface 72d against the step difference surface 74g due to a reaction force received by the entire sealing projecting part 75 from the peripheral edge part of the opening part 12a. In this manner, it is possible to more suitably seal the opening part 12a with the valve body part 70a.

Also, according to the present exemplary embodiment, the annular elastic body 72 includes the annular pinched part 72b surrounding the coupling part 74d and pinched between the root part 74c and the flange part 74e in the axial direction. The pinched part 72b includes the first contact surface 72c and the third contact surface 72e that comes into contact with the lower surface of the root part 74c. Therefore, it is possible to curb the movement of the pinched part 72b in the axial direction relative to the valve body base part 74. In this manner, it is possible to further curb movement of the annular elastic body 72 in the axial direction relative to the valve body base part 74. Therefore, it is possible to more stably attach the annular elastic body 72 to the valve body base part 74. Also, it is possible to seal the portion between the first contact surface 72c and the upper surface of the flange part 74e and the portion between the third contact surface 72e and the lower surface of the root part 74c. Therefore, it is possible to further curb leakage of the entering gas G to the inside of the valve chamber 11 even in a case in which the gas G in the first flow path 12 has entered the portion between the flange part 74e and the annular elastic body 72 in the radial direction in the closed state CS. It is thus possible to further improve the property of sealing the opening part 12a with the valve body part 70a.

Also, according to the present exemplary embodiment, the mover 70 includes the ventilation hole 73 that communicates with the inside of the electromagnetic valve 20 from the one side to the another side in the axial direction. Therefore, it is possible to reduce the weight of the mover 70 by an amount corresponding to the ventilation hole 73. Also, according to the present exemplary embodiment, the ventilation hole 73 includes the outer opening 73*d* that is opened to the inside of the valve chamber 11 in a state in which the sealing projecting part 75 is in contact with the peripheral edge part of the opening part 12*a*. Therefore, the inside of the electromagnetic valve 20 is connected to the inside of the valve chamber 11 via the ventilation hole 73 when the mover 70 moves in the axial direction. In this manner, it is possible to cause air to flow between the inside of the electromagnetic valve 20 and the inside of the valve chamber 11 when the mover 70 moves in the axial direction. Therefore, it is possible to facilitate the movement of the mover 70 in the axial direction.

Specifically, when the mover 70 moves downward and the valve device 1 is switched from the opened state OS to the closed state CS, for example, the air inside the valve chamber 11 is suctioned between the mover 70 and the core member 50 via the ventilation hole 73. In this manner, it is possible to prevent the pressure inside the electromagnetic valve 20 from becoming a negative pressure, and to facilitate the downward movement of the mover 70. Also, when the mover 70 moves upward and the valve device 1 is switched from the closed state CS to the opened state OS, for example, the air between the mover 70 and the core member 50 is discharged to the inside of the valve chamber 11 via the ventilation hole 73. It is thus possible to facilitate the upward movement of the mover 70.

Also, according to the present exemplary embodiment, in a state in which the sealing projecting part 75 is separated furthest in the axial direction from the peripheral edge part of the opening part 12*a*, the outer opening 73*d* is entirely located on the one side in the axial direction beyond the blocking part 61, is accommodated in the guide tubular body 60, and is opened to the inside of the first valve chamber 11*b*. Therefore, it is possible to accommodate the outer opening 73*d* in the guide tubular body 60 in the opened state OS. In this manner, it is possible to curb flowing of the gas G, which has flowed from the opening part 12*a* to the inside of the valve chamber 11, from the outer opening 73*d* into the ventilation hole 73 in the opened state OS. Therefore, it is possible to curb entrance of the gas G to the inside of the electromagnetic valve 20 via the ventilation hole 73. Therefore, it is possible to curb leakage of the gas G to the outside of the valve device 1 via the inside of the electromagnetic valve 20.

Also, according to the present exemplary embodiment, the elastic member 80 which applies an elastic force in the axial direction to the mover 70 is disposed inside the electromagnetic valve 20. The ventilation hole 73 includes the inner opening 73*c* that is opened to a portion inside the electromagnetic valve 20 at which the elastic member 80 is disposed. Here, since the outer opening 73*d* is located on the one side in the axial direction beyond the blocking part 61 and is accommodated in the guide tubular body 60 in the opened state OS as described above, flowing of the gas G into the ventilation hole 73 is curbed. In this manner, flowing of the gas G or impurities (contamination) contained in the gas G from the inner opening 73*c* to the portion where the elastic member 80 is accommodated in the opened state OS is also curbed. Therefore, it is possible to curb degradation of the elastic member 80 such as corrosion of the elastic member 80 due to the gas G or the impurities (contamination) contained in the gas G, for example.

The present disclosure is not limited to the aforementioned exemplary embodiment, and other configurations or other methods can be employed within the scope of the technical ideas of the present disclosure. The material included in the flow path member is not particularly limited. The material included in the flow path member may be metal. The flow path member may have any shape as long as the flow path member includes the first flow path. The fluid flowing through the first flow path and the second flow path is not particularly limited, and may be gas other than the blowby gas, or may be liquid. The first flow path that is opened and closed by the electromagnetic valve may be an OUT port through which the fluid flows out. The flow path member may not include the valve chamber. The flow path member may not include the second flow path.

The electromagnetic valve may have any structure as long as the electromagnetic valve includes a mover that is movable in a predetermined direction. Although the electromagnetic valve is able to open the first flow path in a case in which power is supplied and close the first flow path in a case in which no power is supplied in the aforementioned exemplary embodiment, the present disclosure is not limited thereto. The electromagnetic valve may close the first flow path in a case in which power is supplied and open the first flow path in a case in which no power is supplied. Also, the electromagnetic valve may be a self-retention-type electromagnetic valve that is able to retain the opened/closed state of the first flow path in each of the opened state or the closed state without continuous power supply. The mover may not include the ventilation hole.

The material included in the valve body base part is not particularly limited. The valve body base part may include a non-magnetic body or may include a resin. The small diameter part may not include the root part and the coupling part. In that case, the annular elastic body does not include the pinched part. The annular elastic body may include any material as long as the annular elastic body has elasticity. The material included in the annular elastic body may be an elastomer other than rubber. The method of attaching the annular elastic body to the valve body base part is not particularly limited. The annular elastic body may be secured to the valve body base part with an adhesive.

The sealing projecting part, the second contact surface, and the step difference surface may be disposed in any manner relative to each other as long as the sealing projecting part, the second contact surface, and the step difference surface are at least partially superimposed on each other when seen in the predetermined direction (axial direction), and each of the sealing projecting part, the second contact surface, and the step difference surface may have any size. For example, a portion of the step difference surface may not be superimposed on the second contact surface and the sealing projecting part when seen in the predetermined direction. The sealing projecting part may be provided at any position in the annular elastic body as long as the sealing projecting part is able to surround the opening part of the first flow path when seen in the predetermined direction and come into contact with the peripheral edge part of the opening part. For example, in the aforementioned exemplary embodiment, the sealing projecting part 75 may be located on the inner side in the radial direction beyond the outer edge part of the main body part 72*a* in the radial direction. The sealing projecting part may have any shape as long as the shape is an annular shape. The sealing projecting part may have a shape like a sealing projecting part 175 in an annular elastic body 172 of a valve body part 170*a* illustrated in FIG. 4, for example.

Figure 4:
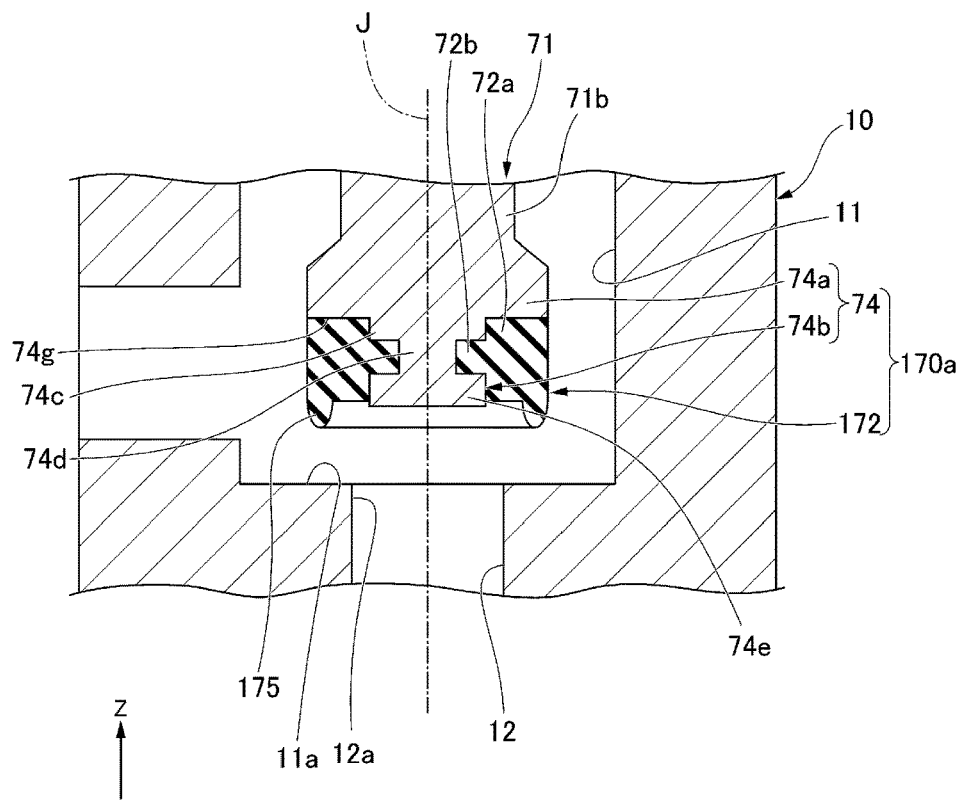
FIG. 4 is a sectional view illustrating a portion of a valve device according to a modification example of the exemplary embodiment.

As illustrated in FIG. 4, the sealing projecting part 175 has a thickness in the radial direction decreasing toward the lower side. In other words, the sealing projecting part 175 has a thickness in the radial direction decreasing toward the peripheral edge part of the opening part 12a in the axial direction. The sectional shape of the sealing projecting part 175 in the section that perpendicularly intersects the circumferential direction is a semi-oval shape projecting downward with a long axis disposed along the axial direction, for example. The other configurations of the valve body part 170a may be similar to the other configurations of the aforementioned valve body part 70a.

According to the configuration illustrated in FIG. 4, the sealing projecting part 175 has a thickness in the radial direction decreasing toward the peripheral edge part of the opening part 12a in the axial direction. Therefore, it is possible to relatively reduce the thickness in the radial direction at the lower end part of the sealing projecting part 175. In this manner, it is possible to relatively reduce the area of the lower surface of the sealing projecting part 175 and to further reduce the contact area between the sealing projecting part 175 and the peripheral edge part of the opening part 12a. Therefore, it is possible to further increase the pressure generated between the lower surface of the sealing projecting part 175 and the peripheral edge part of the opening part 12a. Therefore, it is possible to more suitably seal the portion between the lower surface of the sealing projecting part 175 and the peripheral edge part of the opening part 12a. In this manner, it is possible to further improve the property of sealing the opening part 12a with the valve body part 170a. Also, since the thickness in the radial direction at the lower end part of the sealing projecting part 175 is reduced, the sealing projecting part 175 is more likely to be elastically deformed when the sealing projecting part 175 is pressed against the peripheral edge part of the opening part 12a. In this manner, it is possible to more suitably cause the sealing projecting part 175 to adhere to the peripheral edge part of the opening part 12a. Therefore, it is possible to further improve the property of sealing the opening part 12a with the valve body part 170a.

Applications of the electromagnetic valve and applications of the valve device to which the present disclosure is applied are not particularly limited. For example, the electromagnetic valve and the valve device may be mounted in equipment other than vehicles.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A valve device comprising:
a fluid member that comprises a first flow path; and
an electromagnetic valve that comprises a mover movable in a predetermined direction and is able to open and close the first flow path,
wherein the first flow path comprises an opening part that is opened on one side in the predetermined direction,
the mover comprises a valve body part that is able to open and close the opening part and a ventilation hole that communicates with an inside of the electromagnetic valve from one side to another side in an axial direction,
the fluid member comprises a valve chamber into which the valve body part is inserted,
the electromagnetic valve comprises a blocking part that separates the valve chamber in the axial direction,
the ventilation hole comprises an outer opening that is opened outward in a radial direction, and
the outer opening is located on one side in the axial direction beyond the blocking part when the opening part is in an opened state,
wherein the valve chamber comprises a first valve chamber located on the one side in the axial direction, and a second valve chamber located on the another side in the axial direction and connected to the first flow path, and
the outer opening is accommodated in the first valve chamber when the opening part is in a closed state.

2. The valve device according to claim 1,
wherein the blocking part comprises a through-hole that penetrates through the blocking part in the axial direction, and
the through-hole is defined such that the mover is inserted in the axial direction.

3. The valve device according to claim 1,
wherein the electromagnetic valve comprises an elastic member that applies an elastic force in the predetermined direction to the mover,
the elastic member is disposed inside the electromagnetic valve, and
the ventilation hole comprises an inner opening that is opened at a portion inside the electromagnetic valve at which the elastic member is disposed.

4. The valve device according to claim 1,
wherein the flow path member comprises a second flow path that communicates with the valve chamber,
the first flow path is a flow path, which communicates with the valve chamber via the opening part, through which a fluid flowing into the valve chamber passes, and
the second flow path is a flow path through which the fluid flowing into the valve chamber via the first flow path flows out.

5. A valve device comprising:
a fluid member that comprises a first flow path; and
an electromagnetic valve that comprises a mover movable in a predetermined direction and is able to open and close the first flow path,
wherein the first flow path comprises an opening part that is opened on one side in the predetermined direction,
the mover comprises a valve body part that is able to open and close the opening part and a ventilation hole that communicates with an inside of the electromagnetic valve from one side to another side in an axial direction,
the fluid member comprises a valve chamber into which the valve body part is inserted,
the electromagnetic valve comprises a blocking part that separates the valve chamber in the axial direction,
the ventilation hole comprises an outer opening that is opened outward in a radial direction, and
the outer opening is located on one side in the axial direction beyond the blocking part when the opening part is in an opened state,
wherein the electromagnetic valve comprises a guide tubular body in a tubular shape and surrounding the mover,
the guide tubular body supports the mover such that the mover is movable in the predetermined direction, the blocking part has a plate shape located below the guide tubular body, and the outer opening is accommodated in the guide tubular body when the opening part is in an opened state.

6. A valve device comprising:
a fluid member that comprises a first flow path; and
an electromagnetic valve that comprises a mover movable in a predetermined direction and is able to open and close the first flow path,
wherein the first flow path comprises an opening part that is opened on one side in the predetermined direction,
the mover comprises a valve body part that is able to open and close the opening part and a ventilation hole that communicates with an inside of the electromagnetic valve from one side to another side in an axial direction,
the fluid member comprises a valve chamber into which the valve body part is inserted,
the electromagnetic valve comprises a blocking part that separates the valve chamber in the axial direction,
the ventilation hole comprises an outer opening that is opened outward in a radial direction, and
the outer opening is located on one side in the axial direction beyond the blocking part when the opening part is in an opened state,
wherein the outer opening is located on the another side in the axial direction beyond the blocking part when the opening part is in a closed state.

* * * * *